United States Patent
Shishido et al.

[11] Patent Number: 5,871,138
[45] Date of Patent: Feb. 16, 1999

[54] METHOD AND APPARATUS FOR CONTINUOUS FINISHING HOT-ROLLING A STEEL STRIP

[75] Inventors: Hiroshi Shishido; Kenji Kataoka; Toshisada Takechi; Nobuaki Nomura; Katsuhiro Takebayashi; Yoshikiyo Tamai, all of Chiba, Japan

[73] Assignee: Kawasaki Steel Corporation, Kobe, Japan

[21] Appl. No.: 677,966

[22] Filed: Jul. 10, 1996

[30] Foreign Application Priority Data

Jul. 10, 1995 [JP] Japan .................................. 7-173507

[51] Int. Cl.⁶ .................................................. B23K 20/04
[52] U.S. Cl. ............................... 228/102; 228/9; 228/5.7; 228/158; 228/235.2
[58] Field of Search ........................ 228/5.7, 158, 231, 228/235.2, 9, 102

[56] References Cited

U.S. PATENT DOCUMENTS

| 3,325,623 | 6/1967 | Briggs, III | 228/235.2 |
| 5,217,155 | 6/1993 | Kitahama et al. | 228/5.7 |
| 5,531,089 | 7/1996 | Nikaido et al. | 228/158 |

FOREIGN PATENT DOCUMENTS

| 0495989 A1 | 8/1991 | European Pat. Off. . |
| 0582980 A1 | 8/1993 | European Pat. Off. . |
| 0628361 A1 | 5/1994 | European Pat. Off. . |
| 0661112 A1 | 6/1994 | European Pat. Off. . |
| 52-86956 | 7/1977 | Japan . |
| 60-206505 | 10/1985 | Japan . |
| 60-244401 | 12/1985 | Japan . |
| 63-084708 | 4/1988 | Japan . |
| 63-90302 | 4/1988 | Japan . |
| 4-210809 | 7/1992 | Japan . |
| 4-351213 | 12/1992 | Japan . |
| 6-23406 | 2/1994 | Japan . |
| 6-39404 | 2/1994 | Japan . |
| 6-47406 | 2/1994 | Japan | 228/235.2 |
| 6-63774 | 3/1994 | Japan . |
| 4-100624 | 4/1994 | Japan . |
| 6-114408 | 4/1994 | Japan | 228/235.2 |
| 7-16607 | 1/1995 | Japan . |
| 7-16611 | 1/1995 | Japan . |

*Primary Examiner*—Patrick Ryan
*Assistant Examiner*—Jeffrey T. Knapp
*Attorney, Agent, or Firm*—Oliff & Berridge, PLC

[57] ABSTRACT

A method and apparatus for continuously finishing hot-rolling steel strips include partially joining a rear end of a preceding steel strip and a leading end of a succeeding steel strip after the strips have passed through a rough hot-rolling step. The joint is flattened. The joint is rolled with a first stand of a tandem rolling mill. The mill is provided with a plurality of stands that includes a pair of work rolls and backup rolls and/or intermediate rolls, so that a compression stress acts at the unjointed section of the strips in the longitudinal direction of the joint while tracking the joint. Shape-control-rolling is performed on the joint with a second and succeeding stands so that a section of the steel strip other than the joint is subjected to the shape-control-rolling at all the stands.

31 Claims, 9 Drawing Sheets

METHOD AND APPARATUS FOR CONTINUOUS FINISHING HOT-ROLLING A STEEL STRIP

BACKGROUND OF THE INVENTION

1. Field of the Invention

The present invention relates to a method and apparatus for continuous finishing hot-rolling steel strips.

2. Description of the Related Art

In conventional processes for making steel strips, a slab fed from continuous casting equipment is cut to a given length. Each cut slab is rolled by a rough hot-rolling mill and then by a finishing hot-rolling mill to form steel strips. The steel strips are subsequently coiled.

Recent patents and other documents disclose a method for continuously performing rough and finishing hot-rolling steps in order to improve the quality and the yield of the steel strip, to save energy, and to improve productivity. However, the conventional continuous hot-rolling methods are not practical.

Cold rolling steps have also been used for continuously rolling steel strips. For example, Japanese Laid-Open Patent No. 4-339501 discloses a work roll cross rolling method for a joint of a strip in a continuous cold-rolling method. The reduction ratio and the roll cross angle of a roll incorporated in a stand of rolling mill are changed at the joint of the strip. The crown ratio to the preceding strip is changed at the joint of the strip since it assumes that the difference of the strip thickness between the preceding strip and the succeeding strip is large.

Japanese Laid-Open Patent No. 4-351213 discloses a timing of instructing the changes in the roll cross angle and roll bending force during cold rolling coils which are formed continuously by means of joining. However, timing of change is only carried out by detecting the joint position. Information regarding the physical properties of the joint is not taken into account during the rolling process.

In Japanese Laid-Open Patent No. 52-86956, the rolling speed is reduced when the joint is inserted between the work rolls of the first stand in continuous cold rolling mill. Further, in Japanese Laid-Open Patent No. 60-206505, the tension of the strip is controlled between stands.

However, as opposed to the above-described cold rolling methods, when continuous rolling is carried out with hot rolling equipment, the temperature of the steel strip abruptly increases near the joint. Thus, resistance against deformation at the joint becomes non-uniform and abruptly decreases. These phenomena do not occur in the continuous cold rolling. Therefore, in the hot rolling process, speed control is required at the joint. Also, the joint must be passed through under a controlled rolling reduction ratio and a controlled crown without stress concentration. Each rotation speed of mill rolls of stands must be synchronized with the response of the rotation speed control so that the tension of the strip and the loop do not abruptly change.

Further, a temperature difference exists between the non-joint section and at a location near the joint in the strip. The method for finishing the strip having such a non-uniform temperature distribution to a uniform strip profile has not been completed. Moreover, no prior continuous rolling method discloses that materials with different thicknesses, widths and qualities are joined to each other.

Japanese Laid-Open Patent No. 6-39404 discloses a method for preventing the breakage of the sheet bar in exclusively continuous hot rolling by strengthening the joint of the sheet bar. The butts of the sheet bars are rolled while adjusting the crown schedule with the first and second stands prior to the finishing rolling mill. However, a method for controlling the inlet side stand of the finishing rolling mill to prevent such a breakage is not disclosed.

Japanese Laid-Open Patent No. 60-244401 discloses a method and apparatus for hot-rolling a slab after heating and press-joining the rear end of the preceding slab and the leading end of the succeeding slab. However, the hot rolling process itself is not disclosed in detail.

Japanese Laid-Open Patent No. 63-90302 discloses a method for hot-rolling the slab after heating and press-joining the rear end of the preceding slab and the leading end of the succeeding slab on a travelling carriage. As with Japanese Laid-Open Patent No. 60-244401, the hot rolling process itself is not disclosed in detail. Additionally, in such a conventional continuous hot rolling process, the joint ruptures at the first stand of the finishing hot rolling mill.

Methods for preventing the joint from rupturing in the finishing hot rolling mill include, increasing the rigidity of the rolling mill (Japanese Laid-Open Patent No. 7-16607), and smoothing the temperature distribution around the joint (Japanese Laid-Open Patent No. 7-16611). These methods prevent the joint from breaking by suppressing the tension variation between stands when rolling the joint. Thus, these methods are effective in preventing the joint from breaking at the second half stage of the finishing hot rolling mill. However, these methods do not solve the problems set forth above. Further, since the strip bars are joined before continuous hot-rolling, the work rolls and the motors for driving the work rolls are overloaded due to decreased mill stoppage time. The industry lacks a method and apparatus which addresses the problems described above.

SUMMARY OF THE INVENTION

It is, therefore, an object of the present invention to provide a method and apparatus for continuous hot-rolling steel strips wherein, subsequent to joining a rear end of a preceding strip and a leading end of a succeeding strip, hot rolling is continuously performed. The hot rolling is performed over the strip including the joint, and a sufficient thickness profile is stably achieved.

The present invention is a method for continuously finishing hot-rolling steel strips, comprising partially joining a rear end of a preceding steel strip and a leading end of a succeeding steel strip after both strips have passed through a rough hot-rolling step. The joint is flattened and then rolled with a first stand of a tandem rolling mill. The mill is provided with a plurality of stands that include a pair of work rolls and backup rolls, and/or intermediate rolls, such that compression stress acts at the unjointed section in the longitudinal direction of the joint while tracking the joint. The joint is shape-control-rolled with all the stands so that portions of the steel strip other than the joint are subjected to the shape-control-rolling at all the stands.

The present invention is also an apparatus for continuously finishing hot-rolling a steel strip comprising a cutting unit for cutting a rear end of a preceding steel strip and a leading end of a succeeding steel strip after the steel strips have passed through a rough hot-rolling step. A heating unit heats the rear and leading ends. A joining unit joins the heated ends. A flattening unit flattens the joint. A detecting unit detects and tracks the joint. A plurality of stands roll the jointed steel strip. Each stand includes a pair of work rolls and backup rolls, and/or intermediate rolls. The work rolls in the first stand are provided with a mechanism for providing a compression stress to the steel strip in a longitudinal direction. The work rolls in all the stands are provided with a mechanism for shape-control-rolling the steel strip.

Further objects, details and advantages of the invention will be apparent from the following detailed description, when read in conjunction with the drawings.

DETAILED DESCRIPTION OF THE PREFERRED EMBODIMENTS

Figure 1:
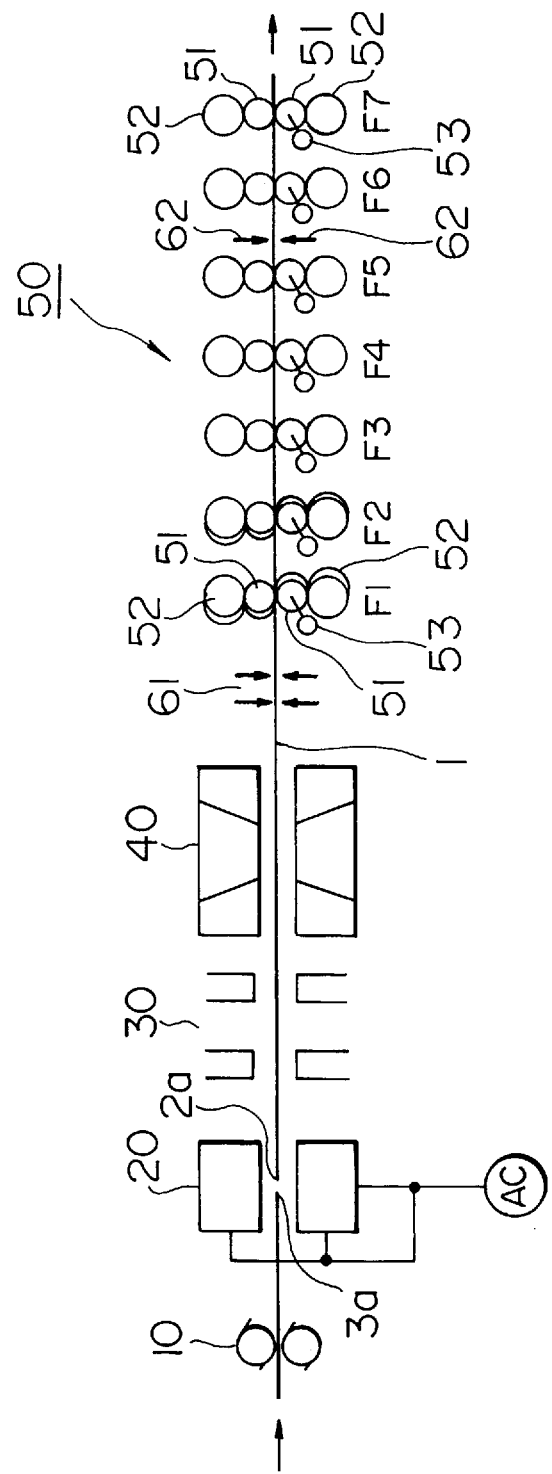
FIGS. 1 and 1A are block diagrams showing an embodiment of a continuous hot-rolling apparatus in accordance with the present invention.

FIG. 1 is a block diagram showing an embodiment of a continuous finishing hot-rolling apparatus in accordance with the present invention.

The continuous finishing hot-rolling apparatus in accordance with the present invention includes a cutting unit 10, a magnetic induction heating unit 20, a joining unit 30, a flattening unit 40, and a tandem rolling mill 50, as shown in FIG. 1. The cutting unit 10, the magnetic induction heating unit 20, the joining unit 30, and the flattening unit 40 are disposed on a traveling joining carriage that is in synchronism with the rolling speed. The tandem rolling mill 50 includes seven stands, each of which includes a work roll 51, a backup roll 52, and an AC motor 53 for driving the work roll 51. These stands are shown in FIG. 1 as a first stand F1, a second stand F2, a third stand F3, etc.

The tandem rolling mill 50 is provided with an inlet side sensor 61 at the inlet side to detect the temperature, thickness, and travelling speed of the steel strip. The tandem rolling mill 50 is also provided with an inter-stand sensor 62 between the fifth and sixth stands to detect the temperature, thickness, and travelling speed of the steel strip.

Loopers (not shown in FIGS. 1 and 10) are provided between the first and second stands and between the second and third stands to suppress the variation of the tension of the steel strip between the stands caused by rolls which press the traveling steel strip via rotation.

The steel strip to be rolled travels from left to right in FIG. 1. The rear end 2a of the preceding steel strip 2 and the leading end 3a of the succeeding steel strip 3 are joined to each other. The joining must be carried out in a short time. Therefore, the joining is carried out by pressing with heat at either the central portion, or at both peripheral edges of the end of the strip. The pressing with heat is not carried out along the entire width of the strip.

Figure 2:
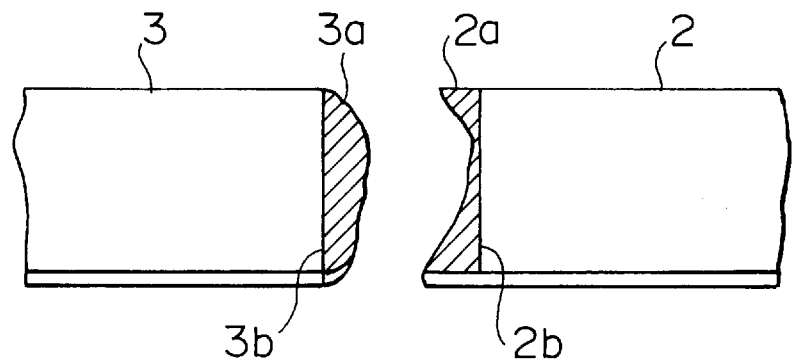
FIG. 2 is a side view showing an example of cutting off the rear end of the preceding strip and the leading end of the succeeding strip for the apparatus of FIG. 1.
Figure 3:
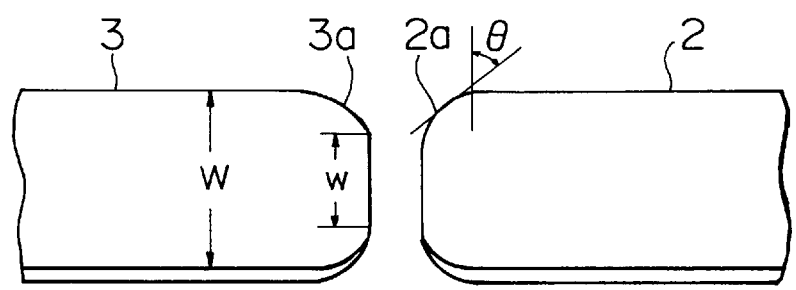
FIG. 3 is a side view showing another example of cutting off the rear end of the preceding strip and the leading end of the succeeding strip for the apparatus of FIG. 1.
Figure 4:
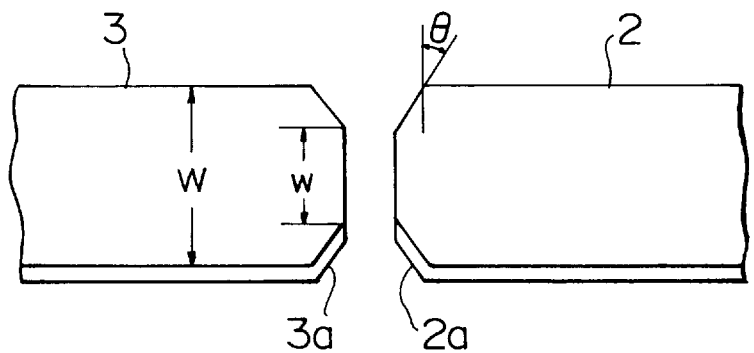
FIG. 4 is a side view showing another example of cutting off the rear end of the preceding strip and the leading end of the succeeding strip for the apparatus of FIG. 1.

FIGS. 2–4 show examples of cutting off the rear end 2a of the preceding steel strip 2 and the leading end 3a of the succeeding strip 3 for the apparatus of FIG. 1.

Two ends are cut with the cutting unit 10 to form cut surfaces. Cross-hatched portions 2a, 3a of FIG. 2 are thus removed. The cut surface 2b at the rear end 2a is straight and perpendicular to the longitudinal direction of the preceding strip 2. The cut surface 3b at the leading end 3a is even and perpendicular to the longitudinal direction of the succeeding strip 3. This arrangement prevents the mutual lateral shift of the central portions in the preceding and succeeding strips 2 and 3 when the two ends are joined by pressing after heating. Such straight cut surfaces 2b and 3b enable uniform heating in electric heating and flash butt heating in consideration of the electrode distribution. Further, surfaces 2b and 3b can be beam-welded by laser and the like, in which only both peripheral edges in the lateral direction of the ends may be welded to each other.

The cut surface may be formed in a shape as shown in FIGS. 3 or 4. In FIG. 3, each peripheral edge 2a, 3a of the cut surfaces 2b and 3b is rounded. In FIG. 4, each peripheral edge 2a and 3a of both cut surfaces 2b, 3b is chamfered. In FIGS. 3 and 4, the central portion, having a width w, of each cut surface of the preceding and succeeding strips 2 and 3 is even and perpendicular to the longitudinal direction. Mutual lateral shift of the central portions of the preceding and succeeding strips 2 and 3 is thus prevented by joining the ends by pressing after heating.

As shown in FIGS. 3 and 4, when the width of the preceding and succeeding strips is W, the width w set forth above should be at least 30% of the width W, and preferably 50% or more of the width W. The angle θ should be less than 45 degrees, and preferably 30 degrees or less. This relationship improves the magnetic induction heating characteristics because the inductive current flows along the shape of the material. The portion at which two cut surfaces which are close to each other is heated most effectively by the proximity effect of the inductive current, while other parts are less effectively heated. Therefore, in FIGS. 3 and 4 the section indicated with the width w is heated to a higher temperature compared with the peripheral rounded or chamfered edges. The press bonding characteristics can be improved further by such a temperature distribution.

The magnetic induction heating unit 20 is the heating unit. The magnetic induction heating unit 20 heats the rear end 2a and leading end 3a of the steel strips to improve their joining properties. The heat source is Joule heat due to eddy current formed at the rear and leading ends 2a, 3a of the steel strips. The eddy current is caused by an inductive magnetic field generated by the magnetic induction heating unit 20.

Heating methods other than magnetic induction heating may be employed. Examples include directly passing electric current through the preceding and succeeding strips 2, 3, directly heating these strips with a burner, and heating using an electric or gas furnace. However, the magnetic induction heating method is preferable to these heating methods because it is a non-contacting heating, it has a shorter heating cycle time, and it is useful for selective heating of required places. Further, the magnetic induction heating characteristics can be readily set by changing the strength and frequency of the inductive magnetic field for the shape, thickness, and other properties of the cut surfaces of the rear and leading ends 2a, 3a. The frequency of the alternate magnetic field in the magnetic induction heating is preferably set for a few thousand Hz or less, or a few hundred Hz in some cases. Such a frequency can be determined in view of the skin effect of the induced current which varies with the thickness, width, and other properties of the steel strip to be rolled.

The distance between the rear end 2a and leading end 3a of the steel strips should be less than 50 mm, and preferably 25 mm or less. This distance is optimally less than 10 mm for specific materials. These constraints must be adhered to for magnetic induction heating in order to improve the heating efficiency by using the proximity effect of the induced current and to decrease the moving distance in the butt joint step while pressing.

Preferable shapes of the cut surfaces of the rear and leading ends 2a, 3a are shown in FIGS. 3 and 4. These shapes are preferred because the circuit of the induced current or eddy current caused by an applied alternate magnetic field depends on the shapes of the steel strips. When the steel strip shown in FIG. 2 is heated as it stands, the cut section is uniformly heated in the lateral direction by modifying the magnetic flux distribution in the inductive heating, wherein the magnetic flux is focused to both peripheral edges of each strip to be joined. When materials are heated that suffer from oxidation at the cut surface to be heated and the surrounding region, e.g., 6.0 wt % and more of Cr content in stainless steel and 0.3 wt % and more of Si in silicon steel, the joining region may be shielded with an inert gas such as argon or nitrogen. This shielding can be performed from the beginning of the heating to the completion of joining the rear and leading ends 2a, 3a. In the case, a concentration of oxygen should be about 10 vol. % or less, preferably about 5 vol. % or less.

The temperature of the rear and leading ends 2a, 3a is determined by the pressing force in joining. When the temperature is excessively high, the rear and leading ends 2a, 3a are significantly damaged. When the temperature is extremely low, joining is not always satisfactory even when applying a large pressing force. Thus, the temperature must be set so that the skin at the surfaces to be joined is slightly melted. However, the rear and leading ends 2a, 3a must not be excessively melted.

Heating the cut surfaces of the shapes shown in FIGS. 3 and 4 so that the skin of the section to be joined is slightly melted enables the peripheral edges to be satisfactorily joined by being pressed against each other. In such a case, a swell in the thickness direction is most prominent in the center in the lateral direction. Such a swell must be flattened as described below.

When the thicknesses of the preceding and succeeding strips 2, 3 are different from each other, the effects of induced currents on their respective skins also differs. The temperature of a thicker strip is generally lower than that of a thinner strip. Forming the preceding and succeeding strips from different materials also may cause a temperature difference due to differences in electric resistivity and magnetic characteristics.

Such a temperature difference between the preceding and succeeding strips 2, 3 must be reduced. When the thickness of strips differs from each other, the frequency of the induced current should be reduced to prevent a temperature decrease of a thicker strip. When electric resistivities differ from each other, the frequency of the induced current must be reduced in response to the lower electric resistivity. Accordingly, it is important that any condition, e.g., the frequency of the induced current, is set in response to the lower temperature side of the preceding and succeeding strips 2, 3.

The joining unit 30 is provided with a clamp pressing mechanism which independently clamps the preceding and succeeding strips 2, 3 heated by the magnetic induction heating unit 20. The preceding and succeeding strips 2, 3 are joined while the joining unit 30 presses them together.

Figure 5:
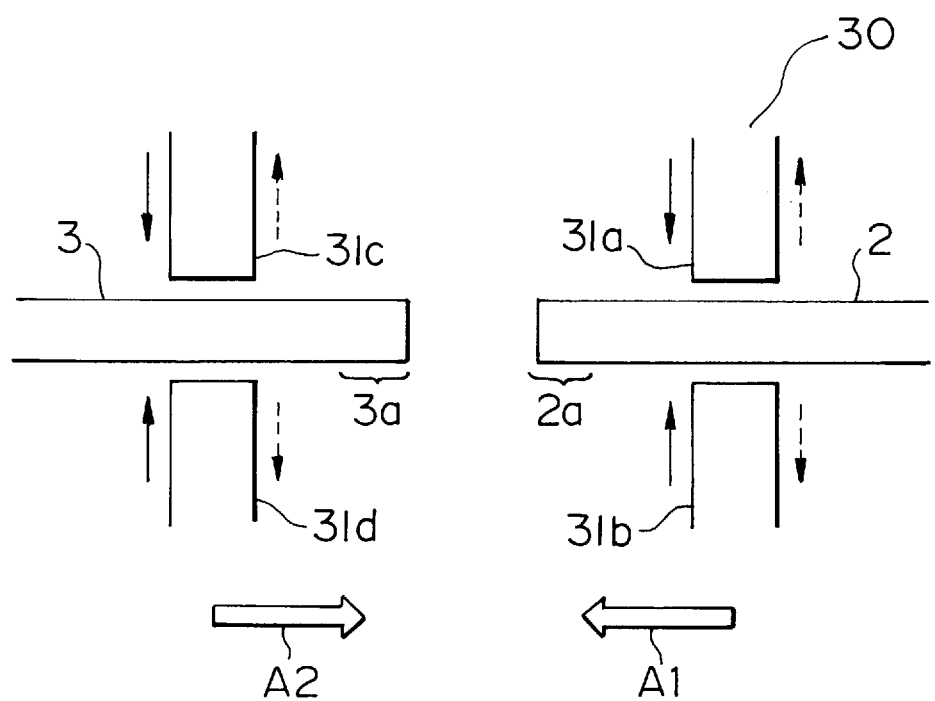
FIG. 5 is a side view showing a clamp pressing mechanism for the apparatus of FIG. 1.

FIG. 5 is a side view showing a clamp pressing mechanism. The preceding strip 2 is clamped by moving clamps 31a and 31b together vertically, as shown by the solid line arrows. The succeeding strip 3 similarly is clamped by moving clamps 31c and 31d vertically. The clamped strips 23 to be jointed are pressed together by moving clamps 31a, 31b in the direction shown by arrow A1, and by moving clamps 31c, 31d in the direction shown by arrow A2. The preceding and succeeding strips 2, 3 are released by moving clamps 31a, 31b, 31c, 31d vertically away from each other, as shown by the broken line arrows.

The position at which the strips are clamped with clamps 31a, 31b, 31c, 31d is determined based upon a range in which the preceding and succeeding strips 2, 3 do not bend or buckle. For example, when the distance between the position at which the strips are clamped and the cut end is 1,000 mm or more, deformation and buckling frequently occurs because of stress during joining caused by the pressing. Accordingly, each clamp should be placed at a position within 1,000 mm, and preferably within 500 mm from its respective cut end.

The stress for joining the clamped strip is determined based upon the softening state of the strips. The softening state of the strips depends upon the strip material and its temperature. For example, when a typical steel strip is subjected to finishing hot-rolling, the strip deformation due to clamping can be prevented by applying a stress of 100 Kg/mm$^2$ or less. Generally, a material is softened more at a higher temperature. Thus, the stress for joining is preferably determined within a range of 100 Kg/mm$^2$, for example, in response to the variation of the joining conditions.

The flattening unit 40 will now be explained.

The thickness of the preceding and succeeding strips 2, 3 must be flattened before the strips are rolled with the tandem rolling mill 50. Local irregularities in the thickness of the strip to be rolled causes non-uniformity in the thickness of the rolled strip, as well as unstable control in the thickness at its peripheral regions.

Figure 6:
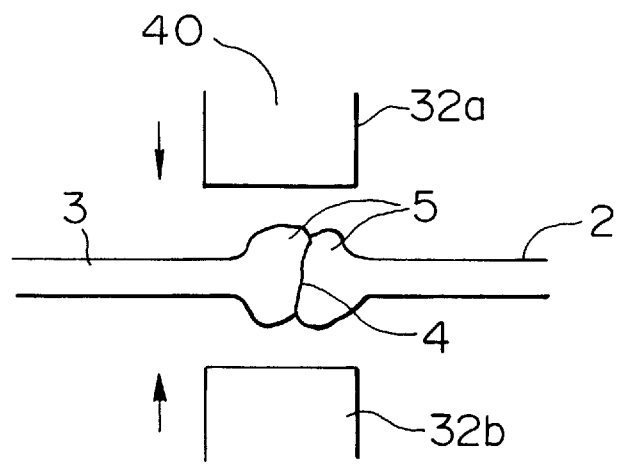
FIG. 6 is a side view showing a flattening treatment for the apparatus of FIG. 1.
Figure 7:
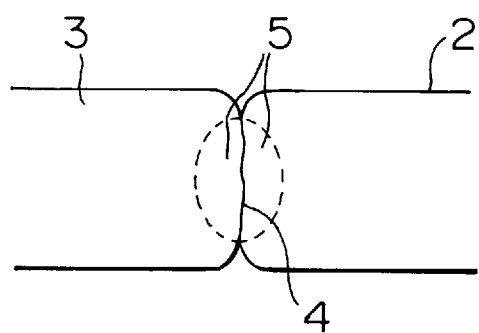
FIG. 7 is a plan view showing a flattening treatment for the apparatus of FIG. 1.

FIGS. 6 and 7 show the strips before flattening these sections. In FIG. 6, the strip has a swelling section 5. The swelling section 5 is formed at and around the joint 4 when the rear and leading ends 2a, 3a are joined. Such a swelling section 5 is caused by a mass flow of the strip in the lateral and thickness directions during joining. The swelling section 5 is flattened by pressing it with a pair of anvils 32a, 32b, which move in a direction indicated by the arrows. However, FIG. 7 shows a swelling section 5, surrounded with a broken circle at the joint 4 of the preceding and succeeding strips 2, 3 in which both edges in the lateral direction are not joined to each other. Both side faces of each strip may be provided with guide units to prevent excessive mass flow in the lateral direction when the strips are pressed with the anvils 32a, 32b. Flattening can be achieved by any other method, e.g. rolling the swelling section 5 in the lateral or longitudinal direction using cross-rolls. Grinding and cutting with grinders and cutters may also be available for flattening.

The temperature difference between the rear and leading ends 2a, 3a is preferably as small as possible when flattening the swelling section 5 near the joint 4 of the rear and leading ends 2a, 3a of the strips. The flattening conditions differ from each other if there is a large temperature difference between the two ends.

A time lag exists between the time when the preceding strip 2 is transferred and when the succeeding strip 3 is transferred. Thus, a temperature difference between the two ends is avoidable due to the difference in cooling times between the rear end 2a and the leading end 3a. The strips must be heated over an additional period of time with the magnetic induced heating unit 20 or similar apparatus even if only a slight temperature difference exists between the two strips, such as 10° C. For example, the strips must be heated until such a temperature difference between the strips vanishes even if the heating time is set to within 30 seconds in the magnetic induced heating unit 20. So, the heating time will be extended.

Such a temperature difference can be effectively removed with a tentative heating means, such as a heating coil applied to the rear end 2a or the leading end 3a. Alternatively, the temperatures of the preceding and succeeding strips 2, 3 may be controlled independently in a slab heating step.

Strip joining is not limited to pressing the strips that are heated by the magnetic induction heating. For example, after the strip ends are cut with a crop shear or a drum shear, the cut ends are welded by a beam, such as laser, electron, or plasma. In this case, the output of the laser beam is preferably 25 kW or more. The laser beam is able to readily irradiate the joint 4 by controlling the laser beam direction with a movable reflection mirror. The joining area must be 30% or more of the entire cut surface area. A joining area of less than 30% may cause the steel strip to rupture in the next rolling step.

It is also effective, after the joining set forth above, to cool the joint to a temperature identical to the temperature at other sections with water or a similar coolant.

Dimples may form at the upper and lower faces of the joint with beam irradiation, since the joint is formed by welding-joining with a smaller pressing force. Finishing hot rolling can be carried out as it stands, or after the flattening treatment, by filling them with a melted filler having the same material as the steel strip 1.

The tandem rolling mill 50 includes seven stands, as shown in FIG. 1. Work and backup rolls in the first and second stands are of the roll-cross system. The crown is adjusted by placing the upper and lower rolls diagonally to the rolling direction so as to cross each other, as disclosed in Japanese Laid-Open Patent 58-304. Further, each of the stands is provided with a bending-system work roll. The roll-cross system set forth above may also include adapted stands other than the first and second stands. Alternatively, only the work roll may be of the roll-cross system. A different number of stands may be used. For example, four or six stands may be satisfactory. The location and number of the stands having the roll-cross system can be freely set.

Figure 1A:
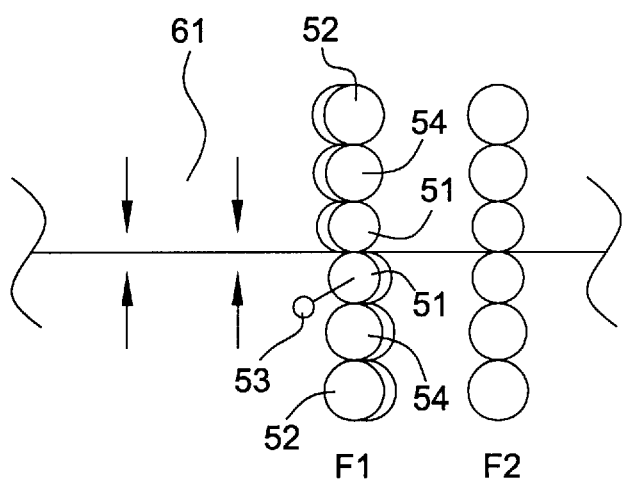

In the present embodiment, although the construction of rolls in the first stand consists of work rolls 51 and backup rolls 52, i.e., a four-high-stand tandem mill, intermediate rolls 54 (FIG. 1A) may be added to construct a six-high-stand tandem mill.

The strips 1 carried to the cutting unit 10 are joined to each other while passing through the magnetic induction heating unit 20 and the joining unit 30, and are flattened with the flattening unit 40 in the tandem rolling mill 50, in accordance with the present embodiment. An interval between the preceding and succeeding strips 2, 3 is noticeably decreased compared with a conventional tandem rolling mill that does not have such a joining system. Thus, in the present invention, non-rolling time or stoppage time is decreased, which decreases the non-driving-load-time of the tandem rolling mill and the non-heating-load-time to the work rolls.

The surface roughness and expansion of the work rolls is promoted since heat is continuously applied to the work rolls for a long time. The surface roughness and abrasion of the work rolls is promoted due to the specified rolling process, i.e., rolling the joint of the preceding and succeeding strips 2, 3, as set forth above.

High speed steel type rolls are used for the work rolls in order to prevent deterioration of the work rolls. The use of the high speed steel type rolls reduces abrasion, cracks, and penetration or fusion of the work rolls, and achieves high productivity, high quality, and energy savings. The high speed steel type rolls may be used for all of the work rolls at all of the stands in the tandem rolling mill, or only for readily abrasive stands. The higher thermal expansion of the high speed steel type rolls must be taken into account when they are used in any stand.

The thermal expansion of high speed steel type rolls is noticeable when they are used in the present embodiment since the work rolls are continuously heated for a long time while continuously rolling in order to join the preceding and succeeding strips 2, 3. On the other hand, such thermal expansion is saturated by continuous rolling. Further, the thermal expansion can be reduced or controlled by an increased amount of cooling water to the work rolls.

In the high speed steel type roll used for the work roll in the present embodiment, the initial crown is determined based upon the thermal expansion on the hot-rolling conditions. The crown may be concave, flat or convex. Further, the crown is maintained at a constant volume by adjusting the cooling of the work roll in response to the heat crown. Alternatively, the crown may be set to a target value by pre-heating the high speed steel type roll before mounting it to the work roll.

Based upon the inventors' investigation, the driving force of each stand must respond quickly to commands for controlling the rolling speed of the joint during hot rolling. Such a quick response can be achieved by AC motors instead of DC motors. In this embodiment, AC motors 53 are used to control the rotation of the work rolls 51 in the tandem rolling mill 50. Each AC motor 53 is provided with an adjustable speed mechanism and rotates upper and lower work rolls 51, which are opposite to each other through the steel strip 1, so that the two rolls have the same speed. Additionally, it has been found by the present inventors that the joint of the steel strip ruptures when the time constant of the response of the AC motor 53 exceeds 33 msec.

The steel strip 1 often ruptures at the joint during continuous rolling with the finishing hot-rolling mill. The present inventors have found that such a rupture is caused by the stress concentrated on the non-joined section of the joint as a result of the analysis of the joint rupture at the first stands in the finishing hot-rolling mill. Since temperature around the joint in the longitudinal direction is higher than its peripheral sections, the deflection of the roll in the mill varies during finishing hot-rolling of the joint. Thus, the crown ratio near the joint decreases. Stress concentrates on the non-jointed section at the inlet side of the first roll stand. Therefore, the rupture starts from the edge at the joint in the first stand of the finishing hot-rolling mill. The cross-sectional area decreases dramatically. Thus, the steel strip will rupture somewhere in the finishing mill, even when the strip is not completely ruptured at the first stand.

Figure 8:
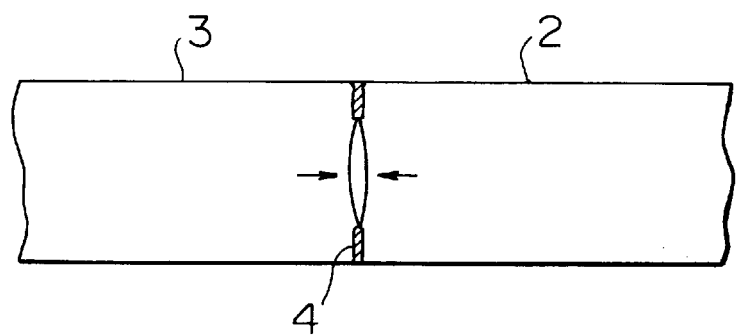
FIG. 8 is a plan view of an example of an as-flattened joint of a steel strip for the apparatus of FIG. 1.
Figure 9:
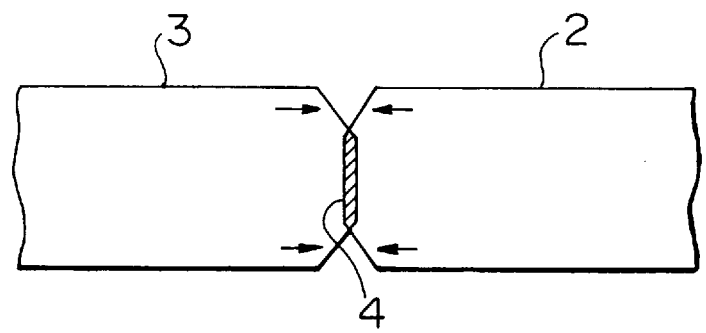
FIG. 9 is a plan view of another example of a joint of an as-flattened steel strip for the apparatus of FIG. 1.

The rupture at the joint can be prevented by rolling the strip so that the crown provides a compression stress to the non-jointed section in the longitudinal direction of the joint in the first stand of the finishing hot-rolling mill. FIG. 8 shows the cut cross-sections of the rear and leading ends 2a, 3a of the steel strip 1 of FIG. 2. The central section is not joined. When the joint 4 is thus formed, the compression stress can be applied to the non-jointed central section of the strip by providing a noticeable concave crown to the strip at the first stand of the finishing hot-rolling mill. Alternatively, FIG. 9 shows the cut cross-sections of the rear and leading ends 2a, 3a of the steel strip 1 formed as shown in FIGS. 3 or 4, wherein both edges of the strip are not joined. The compression stress can be applied to the non-joined edge sections of the strip by providing a noticeable convex crown to the strip at the first stand of the finishing hot-rolling mill.

The crown is controlled at the second stand and afterward to maintain excellent strip shape characteristics, such as steepness.

Figure 10:
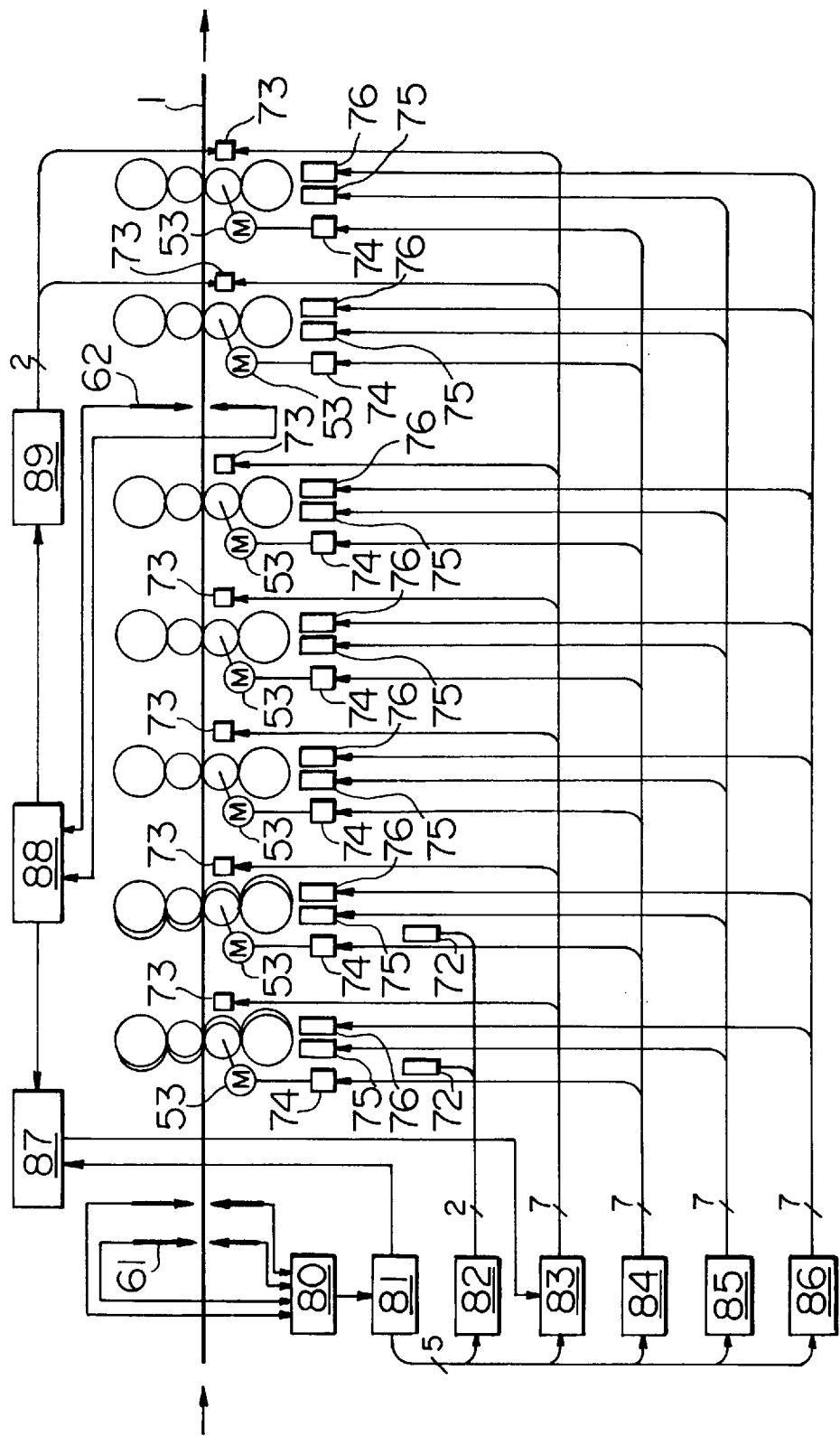
FIG. 10 is a block diagram showing a control mechanism of a tandem rolling mill for the apparatus of FIG. 1.

Each stand is provided with a roll bend controller 73, a roll speed controller 74, a rolling load controller 75, and a roll gap controller 76, as shown in FIG. 10. The first and second stands are further provided with a roll cross angle controller 72. The controllers drive their respective actuators in response to input signals. For example, the roll speed controller 74 at a stand controls the rotation speed of the AC motor 53 of the stand according to the input roll speed.

An inlet side sensor 61 is provided at the inlet side of the first stand in the tandem rolling mill 50. The inter-stand sensor 62 is provided between the fifth and sixth stands. Additionally, the tandem rolling mill 50 is provided with several control units, e.g., an image processing unit 80, a data transfer matching unit 81, a work roll cross angle arithmetic unit 82, a work roll bend arithmetic unit 83, a roll speed arithmetic unit 84, a rolling load arithmetic unit 85, a roll gap arithmetic unit 86, a matching arithmetic unit 87, an inter-stand parameters arithmetic unit 88 and a control arithmetic unit 89.

The inlet side sensor 61 detects a lateral temperature distribution around the joint while tracking the longitudinal direction immediately prior to when the first stand of the tandem rolling mill 50 bites into the joint. The planer temperature distribution of the joint 4 and an area in proximity to the joint of the preceding and succeeding strips 2, 3 can be measured by using such detection with tracking.

The temperature observed by such temperature distribution measurement represents the surface temperature of the strip. Although only measuring the temperature at the upper surface is effective, a more accurate distribution is obtained via measurements at both the upper and lower surfaces. The usable inlet side sensors 61 include various non-contact thermometers, e.g. optical pyrometers, laser thermometers, and infrared pyrometers. Vapor and other materials present between the sensor and the strip surface may be removed with air or an inert gas in order to obtain more accurate data.

The inlet side sensor 61 further measures the shape of the steel strip 1 to be rolled by measuring the distance between the standard surface and a given surface at the upper surface of the strip 1 in the lateral direction. The distances are measured at three points, i.e., both edge sections and one central section in the lateral direction. However, the use of more measuring points provides a more accurate thickness distribution.

The image processing unit 80 reads the planer temperature distribution and strip shape distribution around the joint of the travelling strip from the inlet side sensor 61. The data transfer matching unit 81 determines the most effective change for the uniform strip thickness among the cross angle, the amount of bend, the roll speed, the rolling load, and the roll gap, based on the planer temperature and strip shape distributions from the image processing unit 80, while calculating the planer distribution of the deformation resistance of the strip 1. The changes of control parameters calculated in such a manner are sent to the data transfer matching unit 81, the work roll cross angle arithmetic unit 82, the work roll bend arithmetic unit 83, the roll speed arithmetic unit 84, the rolling load arithmetic unit 85 and the roll gap arithmetic unit 86.

Each of the arithmetic units 81–86 distributes the overall change of its respective control parameter to the individual change of the control parameter for each stand, and sends the individual change to any of control units 72–75 in each stand.

For example, the work roll cross angle arithmetic unit 82 calculates the changes of the cross angle control parameters of the first and the second stands based on the overall change of the cross angle control parameter from the data transfer matching unit 81, and sends these parameters to the roll cross angle controllers 72 of their respective stands. Further, the work roll bend arithmetic unit 83 determines the changes of the control parameters for the amount of bend in the first through seventh stands based on the overall control parameters for the amount of bend from the data transfer matching unit 81, and sends them to their respective roll bend controllers 73. Moreover, the roll speed arithmetic unit 84 determines the changes of the control parameters for the roll speeds in these stands based on the overall control parameters of the roll speed from the data transfer matching unit 81. The roll speed arithmetic unit 84 sends these changes to the respective roll speed controller 74.

AC motors controlled by the roll speed controller 74 provide a better response than DC motors, as described above. The time constant of the response of the AC motor 53 exceeds 33 m sec. Thus, the roll speed at each stand can be readily harmonized with each other, and defects, such as non-uniform strip thickness, can be prevented during the strip travel. Specifically, in continuous hot-rolling of the steel strips while joining them for a long time, preventing such defects is extremely important to maintain continuous rolling.

The AC motors 53 set forth above can partially be substituted for DC motors, according to demand. For example, DC motors can be used in the stand(s) that do not require a quick response in the rolling control.

The inter-stand sensor 62 determines the thickness of the steel strip 1 between any stands provided. Further, the inter-stand parameters arithmetic unit 88 estimates the temperature of the steel strip 1 and the strip shape based on the strip thickness detected by the inter-stand sensor 62 and the rolling load in order to match the data. The matching arithmetic unit 87 determines the parameter that is most effective for the uniform strip thickness by comparing the results from the inter-stand parameters arithmetic unit 88 with the results from the data transfer matching unit 81. By such a comparison, it is determined whether the inlet side sensor 61 or the inter-stand sensor 62 controls the amount of roll bend in the sixth and seventh stands.

When the control is carried out based on the inter-stand sensor 62, the results from the inter-stand parameters arithmetic unit 88 are distributed to the roll bend control units 73 of the sixth and seventh stands through the control arithmetic unit 89. The first–fifth stands are controlled in such a case based on the inlet side sensor 61.

In such a manner, the results detected by the inter-stand sensor 62 are fed to the stands forward of the inter-stand sensor 62 to vary the roll cross angle and roll bend so as to control the crown.

The results from the inlet side sensor 61 and the inter-stand sensor 62 may be juxtaposed. Alternatively, rolling may be carried out based on the information from only the inlet side sensor 61 by removing the inter-stand sensor 62.

Additionally, a sensor for detecting the lateral shape of the strip, e.g., steepness, may be provided between the first and second stands. The data from such a sensor is compared with the target values. The amount of roll bend, roll cross and roll shift is determined based on the difference between such a sensor and the target values. The strip shape that is required to prevent the strip from rupturing can be obtained by feeding these parameters back to the first stand. Further, at least one inter-stand sensor for detecting the lateral strip shape, such as the steepness, is provided between the stands that are ahead of the second stand. The amount of roll bend, roll cross and roll shift on the stand immediately behind this sensor and the stands ahead of this sensor is determined based on the difference between the detected results and the target value to feed backward to those stands. A satisfactory strip shape is thus obtained.

The strip thickness or crown may be controlled by a roll cross method in one or more stands. When high speed steel type rolls are used as work rolls, heat is accumulated in the work rolls due to the thermal expansion of the rolls. Since the heat crown of the roll varies drastically, it is extremely important to control the crown in the work rolls showing vigorous thermal expansion. Accordingly, in the present embodiment, the crown is controlled by the roll cross method in the increasing crown, or by the work roll bender method in the decreasing crown, based on the estimation of the thermal expansion. The crown can be controlled more precisely by crossing both the work rolls and the backup roll. Further, the high speed steel type roll can only be used for the readily abraded stand. However, the high speed steel type roll is not limited to this usage.

The present invention is explained based on the following Examples.

EXAMPLE 1

A sheet bar having a thickness of 35 mm as a preceding strip 2 was obtained by rough hot-rolling a slab having a width of 1,300 mm and a thickness of 260 mm which was obtained by continuously casting plain carbon steel. A sheet bar having a thickness of 35 mm as a succeeding strip 3 was obtained by rough hot-rolling a slab having a width of 1,300 mm and a thickness of 260 mm which was obtained by continuously casting plain carbon steel. Each of the rear end 2a of the preceding strip 2 and the leading end 3a of the succeeding strip 3 have a cut surface shape shown in FIG. 3, in which w equals 1200 mm. After forming such a cut surface, the cut end 2b of the preceding strip 2 and the cut end 3b of the succeeding strip 3 were moved toward each other until they were 5 mm apart while the cut ends were heated with the magnetic induction heating unit 20 to 1,280° C. The cut ends were joined while pressing with the clamp pressing mechanism shown in FIG. 5. The swelling section formed at the joint was flattened with a spiral cutting machine.

Work rolls used in all the stands were high speed steel type rolls. The high speed steel type rolls had been formed by a centrifugal casting process and had a surface layer comprising 1.0 wt % of carbon, 1.2 wt % of silicon, 0.8 wt % of manganese, 8.0 wt % of chromium, 12.0 wt % of molybdenum, 5.0 wt % of tungsten, 5.0 wt % of vanadium, 2.0 wt % of cobalt, 0.01 wt % of boron, and the balance being substantially iron. The steel strip joined in such a manner was hot-rolled with the tandem rolling mill 50 shown in FIG. 10 to a 2 mm finishing thickness.

Although not shown in FIG. 10, sensors for detecting the flatness and steepness of the strip were provided at points between the first and second stands, and between the sixth and seventh stands. The control parameters of the stand immediately ahead of the each sensor were determined based on the detected data and were fed back to the above stands.

Rolling was carried out under an inter-stand tension of 5 to 10 MPa between stands from the first to fourth stands, and an inter-stand tension of 15 to 20 MPa between stands from the fifth to seventh stands. The amount of work roll bend and work roll cross angle is controlled so that the crown ratio is increased by 0.2% after the rolling at the first stand, viz. the crown at the sheet bar edge 100 mm before rolling was approximately 150 $\mu$ (the crown ratio=0.5%, crown/thickness=0.15 mm/30 mm), whereas the crown at the sheet bar edge 100 mm after rolling was approximately 140 $\mu$ (the crown ratio=0.7%, crown/thickness=0.14 mm/20 mm). Cracks at the joint during rolling were suppressed to 10 mm or less, and the total width of unjointed sections at both edges was 120 mm. Rolling at the following stands was stably performed without the propagation of cracks.

By comparison, when the work roll cross angle and the amount of work roll bend were controlled so that the crown ratio decreased by 0.1%, wherein the crown at the sheet bar edge 100 mm before rolling was approximately 80 $\mu$ (the crown ratio=0.4%, crown/thickness=0.08 mm/20 mm), cracks of 150 mm were formed at both edges. Thus, the total unjointed widths, including the enjoined width at the joining process, 50 mm, reached 400 mm, and constituted to 30% of the total width. The joint was completely ruptured between the fifth and sixth stands during rolling.

Figure 11:
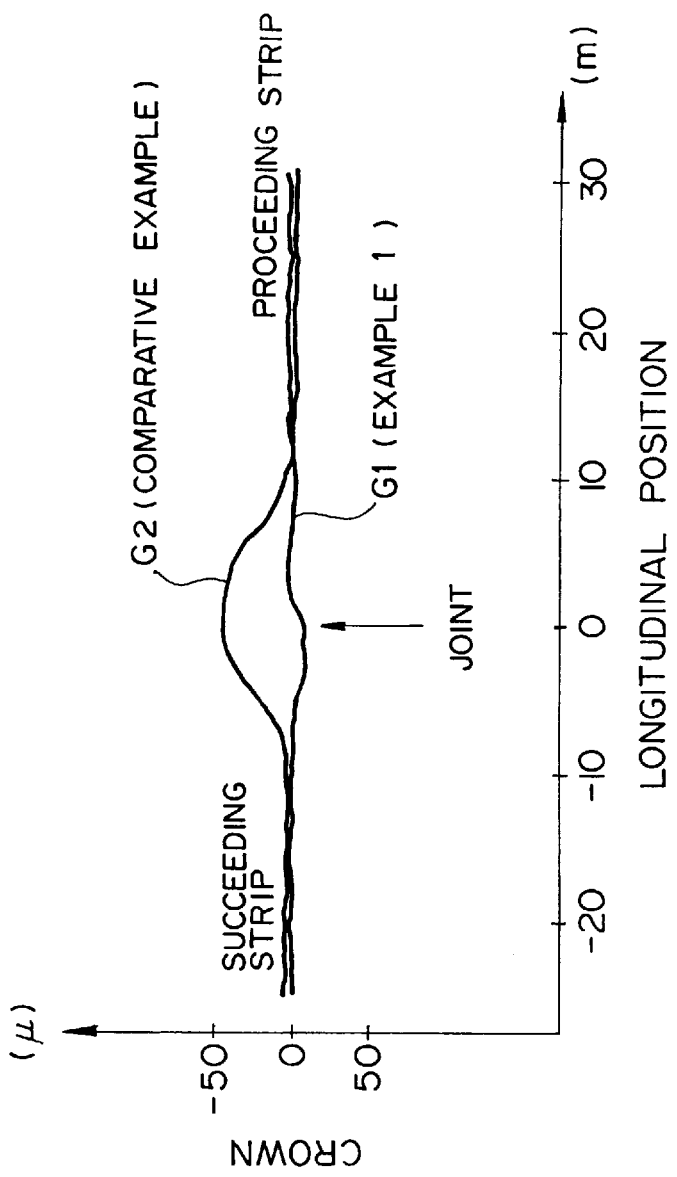
FIG. 11 a graph showing the crown at each longitudinal position of a steel strip that is rolled by the first embodiment of the continuous hot-rolling mill in accordance with the present invention.

FIG. 11 is a graph illustrating Example 1 in accordance with the present invention. The graph shows the crown change in the longitudinal direction of the steel strip. The vertical axis indicates the crown represented by the difference of the thicknesses between the central portion of the strip laterally and a point 100 mm from the strip edge. G1 represents an automatic thickness control of the joint in accordance with the present invention (Example), whereas G2 represents no thickness control of the joint (Comparative Example). FIG. 11 shows that the crown is controlled to a low level even at the joint in the present invention (G1).

EXAMPLE 2

A sheet bar having a thickness of 35 mm as a preceding strip 2 was obtained by rough hot-rolling a slab having a width of 1,000 mm and a thickness of 220 mm which was obtained by continuously casting stainless steel SUS430. A sheet bar having a thickness of 35 mm as a succeeding strip 3 was obtained by rough hot-rolling a slab having a width of 900 mm and a thickness of 220 mm which was obtained by continuously casting stainless steel SUS430. Each of the rear end 2a of the preceding strip 2 and the leading end 3a of the succeeding strip 3 have a cut surface shape as shown in FIG. 3, wherein w equals 800 mm. After forming such a cut surface, the cut end 2b of the preceding strip 2 and the cut end 3b of the succeeding strip 3 were moved toward each other until they are 5 mm apart while the cut ends were heated with the magnetic induction heating unit 20 to 1,280° C. The cut ends were joined while pressing with the clamp pressing mechanism as shown in FIG. 5. The joint and the area around the joint were shielded with an inert gas containing 2.0 vol. % oxygen during the joining process. The swelling section formed at the joint was flattened with the flattening unit 40.

Work rolls used in the first to the third stands were high speed steel type rolls. The high speed steel type rolls had been formed by a centrifugal casting process and had a surface layer comprising 1.0 wt % of carbon, 1.2 wt % of silicon, 0.8 wt % of manganese, 6.0 wt % of chromium, 7.0 wt % of molybdenum, 7.0 wt % of tungsten, 1.0 wt % of vanadium, 1.0 wt % of niobium, and the balance being substantially iron. The steel strip joined in such a manner was hot-rolled with the tandem rolling mill 50 shown in FIG. 10 to a finishing thickness of 3.5 mm.

Although not shown in FIG. 10, sensors for detecting the flatness and steepness of the strip were provided at points between the first and second stands, and between the sixth and seventh stands. The control parameters of the stand immediately ahead of each sensor were determined based on the detected data and were fed back to these stands.

Rolling was carried out under an inter-stand tension of 5 to 10 MPa between stands from the first to the fourth stands, and an inter-stand tension of 20 to 25 MPa between stands from the fifth to the seventh stands. The amount of work roll bend and the work roll cross angle was controlled so that the crown ratio increased by 0.25% after the rolling at the first stand, viz. the crown at the sheet bar edge 100 mm before rolling was approximately 210 $\mu$ (the crown ratio=0.6%, crown/thickness=0.21 mm/35 mm), whereas the crown at the sheet bar edge 100 mm after rolling was approximately 170 $\mu$ (the crown ratio=0.85%, crown/thickness=0.17 mm/20 mm). Cracks at the joint during rolling were suppressed to 10 mm or less, and the total width of unjointed sections at both edges was 120 mm. Rolling at the following stands was stably performed without the propagation of cracks.

By comparison, when the work roll cross angle and the amount of work roll bend were controlled so that the crown ratio decreased by 0.1%, wherein the crown at the sheet bar edge 100 mm before rolling was approximately 100 $\mu$ (the crown ratio=0.5%, crown/thickness=0.1 mm/20 mm), cracks of 150 mm were formed at both edges. Thus, the total unjointed widths including the enjoined width at the joining process, 50 mm, reached 400 mm, and constituted to 50% of the total width. The joint was completely ruptured between the fifth and sixth stands during rolling.

Figure 12:
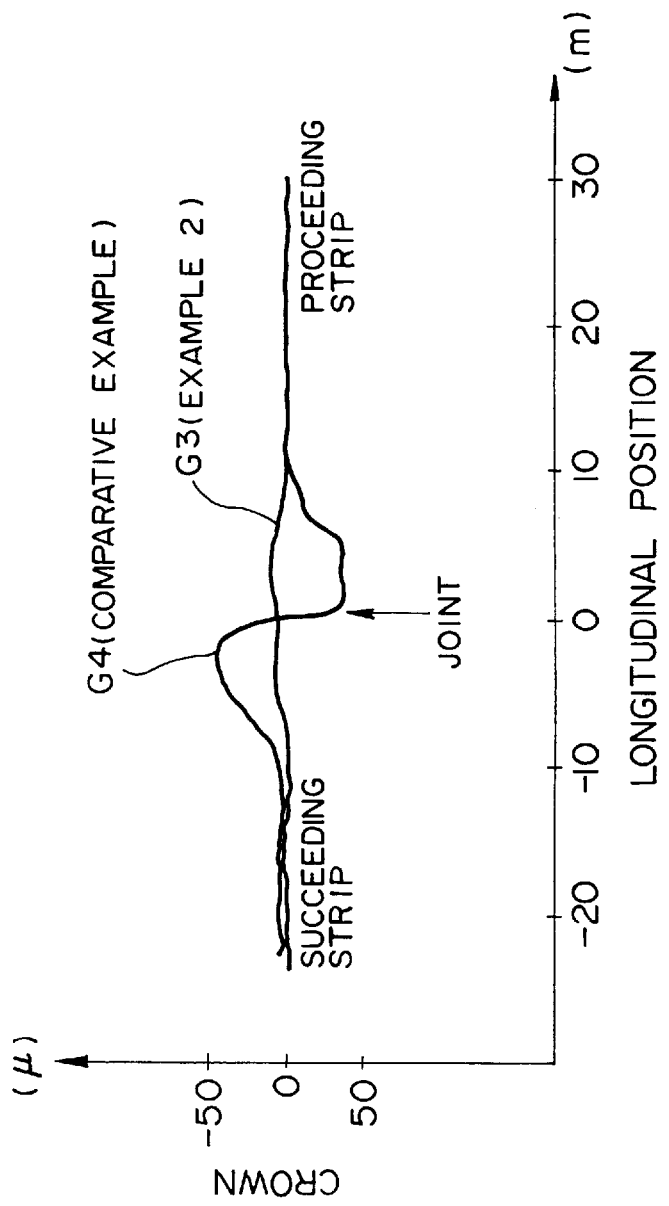
FIG. 12 a graph showing the crown at each longitudinal position of a steel strip that is rolled by a second embodiment of the continuous hot-rolling mill in accordance with the present invention.

FIG. 12 is a graph showing the crown change in the longitudinal direction of the steel strip. The vertical axis is identical to the vertical axis of FIG. 11. G3 represents an automatic thickness control of the joint in accordance with the present invention (Example), whereas G4 represents no thickness control of the joint (Comparative Example). FIG. 12 also shows that the crown is controlled to a low level even at the joint in the present invention (G3).

In a method for continuously finishing hot-rolling a steel strip in accordance with the present invention, after the rear end of the preceding steel strip and the leading end of the succeeding steel strip are joined, the steel strip including the joint can be continuously rolled during finishing hot-rolling. Excellent thickness and steepness are thus stably obtained. Further, these advantages will be achieved by a continuous cold-rolling process with minor modifications.

What is claimed is:

1. A method for continuously finishing hot-rolling a steel strip, comprising:

partially joining a rear end of a preceding steel strip and a leading end of a succeeding steel strip, the preceding and succeeding steel strips having passed through a rough hot-rolling step;

flattening a joint created by joining the preceding and succeeding steel strips;

rolling the joint with a first hot-rolling stand of a tandem rolling mill, the tandem rolling mill being provided with a plurality of hot-rolling stands comprising a pair of work rolls and backup rolls, such that a compression stress acts at an unjoined section of the joint in the longitudinal direction while tracking the joint; and performing shape-control-rolling of the joint with a second and succeeding hot-rolling stands so that a portion of the steel strip other than the joint is subjected to the shape-control-rolling at all the hot-rolling stands.

2. The method for continuously finishing hot-rolling a steel strip according to claim 1, wherein the work roll is a high speed steel type roll.

3. The method for continuously finishing hot-rolling a steel strip according to claim 1, wherein a temperature at the joint and an area in proximity to the joint of the steel strip is detected at an inlet side of the first hot-rolling stand in the tandem rolling mill, the temperature being used to calculate a temperature distribution; and wherein a rolling speed, rolling load, reduction ratio, an amount of roll bend and/or roll cross angle, and an amount of roll shift are determined based on the calculated temperature distribution and are fed forward to all the hot-rolling stands of the rolling mill.

4. The method for continuously finishing hot-rolling a steel strip according to claim 3, wherein one of steepness and thickness distribution of the steel strip is detected with a sensor provided between the first and second hot-rolling stands of the tandem rolling mill; and an amount of roll bend and/or roll cross angle, and the amount of roll shift are determined based on the detected one of steepness and thickness distribution of the steel strip and are fed back to the first hot-rolling stand.

5. The method for continuously finishing hot-rolling a steel strip according to claim 1, wherein a thickness and temperature of the steel strip are detected with at least one sensor provided between adjacent hot-rolling stands ahead of the second hot-rolling stand in the tandem rolling mill, wherein a thickness, a thickness distribution, and a shape and temperature distribution in the longitudinal direction of the steel strip are determined based on the detected thickness and temperature and are fed forward to all the hot-rolling stands ahead of the at least one sensor.

6. The method for continuously finishing hot-rolling a steel strip according to claim 5, wherein a thickness and temperature of the steel strip are detected with at least one sensor provided at an outlet side of the hot-rolling stands ahead of the second hot-rolling stand in the tandem rolling mill, wherein an amount of roll bend and/or roll cross angle, and an amount of roll shift are determined based on the detected thickness and temperature and are fed back to the hot-rolling stand immediately behind the at least one sensor.

7. The method for continuously finishing hot-rolling a steel strip according to claim 1, wherein the rear end of the preceding steel strip and the leading end of the succeeding steel strip are joined by a high energy-density hot source so as to form at least one of a flat portion and a recessed portion on each of the upper face and the lower face at the joint of the steel strip, and the steel strip is subjected to the hot-rolling step.

8. The method for continuously finishing hot-rolling a steel strip according to claim 7, when a recessed portion occurs casting a filler onto the recessed portion to flatten the recessed portion.

9. The method for continuously finishing hot-rolling a steel strip according to claim 1, wherein said plurality of hot-rolling stands further comprises a pair of intermediate rolls, an intermediate roll between each paired work roll and backup roll of the pair of work rolls and backup rolls.

10. The method for continuously finishing hot-rolling a steel strip according to claim 9, wherein the rear end of the preceding steel strip and the leading end of the succeeding steel strip are joined by a high energy-density hot source so as to form at least one of a flat portion and a recessed portion on each of the upper face and the lower face at the joint of the steel strip, and the steel strip is subjected to the hot-rolling step.

11. The method for continuously finishing hot-rolling a steel strip according to claim 10, casting a filler onto the recessed portion to flatten the recessed portion.

12. The method for continuously finishing hot-rolling a steel strip according to claim 1, wherein the rear end of the preceding steel strip and the leading end of the succeeding steel strip are joined by concurrently applying heat and pressure by a magnetic induction heating means.

13. The method for continuously finishing hot-rolling a steel strip according to claim 12, wherein the rear end of the preceding steel strip and the leading end of the succeeding steel strip are joined by concurrently applying heat and pressure while shielding the joint and an area in proximity to the joint with an inert gas.

14. The method for continuously finishing hot-rolling a steel strip according to claim 13, wherein the steel strip is selected from a group consisting of stainless steel containing at least 6.0 wt % of chromium and silicon steel containing at least 0.3 wt % of silicon, the concentration of oxygen in the inert gas being 10 vol. % or less.

15. An apparatus for continuously finishing hot-rolling a steel strip, comprising:
  a cutting unit for cutting a rear end of a preceding steel strip and a leading end of a succeeding steel strip, the preceding and succeeding steel strips having passed through a rough hot-rolling step;
  a heating unit for heating the rear and leading ends;
  a joining unit for joining the heated ends;
  a flattening unit for flattening a joint created by joining the heated ends of the steel strips;
  a detecting unit for detecting and tracking the joint;
  and a plurality of hot-rolling stands for rolling the jointed steel strip, each stand comprising at least a pair of work rolls and backup rolls, the work rolls in the first hot-rolling stand being provided with a means for providing a compression stress to the steel strip in the longitudinal direction, the work rolls in all the hot-rolling stands being provided with a means for shape-control-rolling the steel strip.

16. The apparatus for continuously finishing hot-rolling a steel strip according to claim 15, wherein the heating unit includes a magnetic induction heating means.

17. The apparatus for continuously finishing hot-rolling a steel strip according to claim 15, wherein the rear end of the preceding steel strip and the leading end of the succeeding steel strip are joined by concurrently applying heat and pressure while shielding the joint and an area in proximity to the joint with an inert gas.

18. The apparatus for continuously finishing hot-rolling a steel strip according to claim 15, wherein said work roll is a high speed steel type roll.

19. The apparatus for continuously finishing hot-rolling a steel strip according to claim 15, wherein the work roll is provided with an AC driving motor having a response of a time constant of 33 msec or less.

20. The apparatus for continuously finishing hot-rolling a steel strip according to claim 15, wherein the means for providing a compression stress and the means for shape-control-rolling the steel strip are selected from a group consisting of a work roll bender system, a work roll cross system and a work roll shift system.

21. The apparatus for continuously finishing hot-rolling a steel strip according to claim 15, further including a sensor for detecting a temperature of the joint and an area of the steel strip in proximity to the joint at the inlet side of the tandem rolling mill; an arithmetic unit for calculating a temperature distribution in an area in proximity to the joint based on the detected temperature; a control unit for determining a rolling rate, a rolling load, a reduction ratio, an amount of roll bend and/or roll cross angle, and an amount of roll shift based on the calculated data to feed forward the rolls in all the hot-rolling stands.

22. The apparatus for continuously finishing hot-rolling a steel strip according to claim 21, further including a sensor for detecting a lateral shape of the steel strip provided between the first and second hot-rolling stands of the tandem rolling mill, and a control unit for determining an amount of roll bend and/or roll cross angle, and an amount of roll shift based on the detected lateral shape and for feeding back the amount of roll bend and/or roll cross angle to the first hot-rolling stand.

23. The apparatus for continuously finishing hot-rolling a steel strip according to claim 15, further including at least one sensor for detecting a thickness and a temperature of the steel strip provided between the adjacent stands ahead of the second hot-rolling stand of the tandem rolling mill, an arithmetic unit for calculating a shape and a temperature distribution of the steel strip based on the detected thickness and temperature, and a control unit for feeding forward the calculated data to rolls in the hot-rolling stand ahead of the sensor.

24. The apparatus for continuously finishing hot-rolling a steel strip according to claim 23, further including at least one sensor for detecting a steepness and a thickness distribution of the steel strip, the at least one sensor being provided at an outlet side of a hot-rolling stand ahead of the second hot-rolling stand of the tandem rolling mill, a control unit for determining an amount of roll bend and/or roll cross angle, and an amount of roll shift based on the detected steepness and thickness, and for feeding back the calculated data to the hot-rolling stand immediately ahead of the sensor.

25. The apparatus for continuously finishing hot-rolling a steel strip according to claim 15, wherein said joining unit comprises a high energy-density hot source.

26. The apparatus for continuously finishing hot-rolling a steel strip according to claim 25, wherein said high energy-density hot source is one source selected from the group consisting of a laser beam, an electron beam, and a plasma beam.

27. The apparatus for continuously finishing hot-rolling a steel strip according to claim 25, wherein said flattening unit is a filler-casting unit.

28. The apparatus for continuously finishing hot-rolling a steel strip according to claim 15, wherein said plurality of hot-rolling stands further comprises a pair of intermediate rolls, an intermediate roll between each paired work roll and backup roll of the pair of work rolls and backup rolls.

29. The apparatus for continuously finishing hot-rolling a steel strip according to claim 28, wherein said joining unit comprises a high energy-density hot source.

30. The apparatus for continuously finishing hot-rolling a steel strip according to claim 29, wherein said high energy-density hot source is one source selected from the group consisting of a laser beam, an electron beam, and a plasma beam.

31. The apparatus for continuously finishing hot-rolling a steel strip according to claim 29, wherein said flattening unit is a filler-casting unit.

* * * * *